Oct. 7, 1969 J. F. COULEUR ET AL 3,471,834

DATA PROCESSING UNIT FOR EXECUTING COMMANDS BY EXTERNAL APPARATUS

Filed May 4, 1964

INVENTORS
J.F. Couleur
P.F. Gudenschwager
W.A. Shelly
D.L. Bahrs
BY [signature]
ATTORNEY United States Patent Office 3,471,834
Patented Oct. 7, 1969

3,471,834
DATA PROCESSING UNIT FOR EXECUTING COMMANDS BY EXTERNAL APPARATUS

John F. Couleur, Philip F. Gudenschwager, and William A. Shelly, Phoenix, Ariz., and David L. Bahrs, Liverpool, N.Y., assignors to General Electric Company, a corporation of New York Filed May 4, 1964, Ser. No. 364,692
Int. Cl. G06f *15/00*
U.S. Cl. 340—172.5 11 Claims

ABSTRACT OF THE DISCLOSURE

Input/output control apparatus for a data processing system, wherein the control apparatus relieves the data processor of the system of much of the burden of controlling input/output operations by supplying the necessary input/output command and related information to the processor when data must be transferred into or out of the system.

This invention relates to information processing apparatus and more particularly to apparatus for processing at high speeds data received from a plurality of lower speed external devices.

In the processing of data, various arithmetic, logical, or data transfer operations are performed on data items by a data processing unit, the unit being adapted to execute a sequence of these operations in a very short period of time. Each data item comprises a plurality of data digits. These data items are supplied by external units, which include peripheral apparatus, such as magnetic tape and disc storage devices, punched card readers, and electrical typewriters and remote apparatus, such as other data processing apparatuses, radar stations, and radio telemetry transmitters. The processed data is received by external units, which include peripheral apparatus such as magnetic tapes and disc storage devices, card punches, and printers and remote apparatus, such as other data processing apparatuses and radio guidance systems. To maintain a rapid rate of execution of these operations, the data processing unit must be able to obtain data items immediately when needed and to store the items immediately after processing. Rapid supply and storage of data items is provided by a high-speed random access memory.

The random access memory operates at a rate of speed compatible with that of the data processing unit, rapidly supplying a data item required by the data processing unit or rapidly storing a data item processed by the data processing unit. These data items are held in respective addressable storage locations in the memory and a data item is retrieved from or stored in a storage location identified by an address. Additionally, the random access memory holds in a group of storage locations thereof instructions for controlling the sequence of operations to be executed by the data processing unit. An instruction normally comprises a command portion for designating the specific type of arithmetic, logical or data transfer operation to be performed and an address portion identifying the storage location in the memory to be involved in the specific operation.

The data processing unit, prior to processing data received from each of a plurality of lower speed external devices, transfers the data as received into a respective first group of storage locations in the memory. When a predetermined amount of data received from an external device has been stored in the corresponding first storage location group, means is provided to notify the data processing unit, whereupon this data is transferred to a second group of storage locations from which the data is processed. The data results in such processing are then stored in one of a third group of storage locations, a third group being provided for each of the external devices adapted to receive data from the data processing unit.

A high-speed data processing unit of the type described is a complex and costly apparatus. A factor tending to increase the complexity and cost of the data processing unit is that the external devices, although operating at speeds much lower than the data processing unit, also operate at a plurality of mutually different speeds. Additionally, each such external device usually supplies or receives data at a rate asynchronous with respect to the operating rate of the data processing unit. Accordingly, it is common practice for each external device upon requiring communication with the data processing unit for transferring data to or for receiving data from the memory, to provide a signal, known as an interrupt signal, for notifying the data processing unit of the respective communication requirement. The data processing unit must respond to the interrupt signal by interrupting its normal sequence of data processing operations and granting communication to the external device for effecting the requisite data transfer. However, inasmuch as the external devices operate at different speeds, some cannot wait as long as others before being granted communication with the memory. Therefore, the data processing unit must also provide apparatus for allocating a different priority to each external device, and for recognizing such priorities by granting communication first to the external device allocated highest priority when more than one device requires communication.

Several other factors affect the complexity of the described apparatus as follows: (a) An external device may be adapted either to supply or to receive data at a given time. (b) An external device may be adapted to supply or receive at one time one data digit, a set of digits, or an entire data item. (c) Successive data items supplied by an external device must be transferred to different storage locations of a corresponding first group of locations prior to transfer of the data from this first group to a second group of locations for processing, and successive data items received by an external device must be received from different storage locations of a corresponding third group of locations until these locations are resupplied with processed data. Accordingly, not only must the data processing unit provide means for granting communication to the highest priority external device currently requiring communication, but it must provide for the selective transmittal or reception of data for the external device; it must provide for the transfer of one data digit, a set of digits, or an entire data item during the communication granted; and it must provide that the data be transferred from or to the correct storage location during each communication for the particular external device.

In prior art devices, it has been the practice to store complete control information in the data processing unit, such as in the random access memory thereof, for each external device. Such information represents, for each external device, the direction of communication to be required, the quantity of data to be transferred, and the storage address to be involved in each communication. Upon recognition of the highest priority external device requiring communication, the data processing unit executes a series of operations to first retrieve the control information for this external unit, and from such control information to initiate a command for providing the appropriate direction for data transfer between the data processing unit and the external device, to activate control circuits to provide for transfer of the requisite number of digits, and to process address-representing control information to provide the correct storage location to be involved in the data transfer. Additionally, the series of operations has to provide for making and updating a record of the number of particular type data transfers executed for each external unit. These records supply information as to when the corresponding first group of storage locations is filled or third group of storage locations is emptied by the external device, so that the data processing unit can respectively empty or fill these groups for subsequent employment by the respective external unit.

A prior art data processing unit constructed to automatically execute these operations for providing the requisite communication is unusually complex and costly. Additionally, the time required to perform these operations reduces the effective speed of the data processing unit for processing data. On the other hand, a prior art data processing unit which performs these operations by executing a corresponding series of instructions must sacrifice memory storage space required for normal data processing operations in order to hold the large set of instructions required, or the unit must be provided with a larger memory. Additionally, this latter type of data processing unit has its effective data processing speed considerably reduced due to the time required to retrieve all required instructions of the set from the memory and to execute such instructions. It is therefore desirable to provide apparatus for freeing the data processing unit of the costly and time-consuming burden of preparing for the particular type of data transfer required by each external device whenever one of a plurality of external devices requires communication with the data processing unit.

Therefore, it is an object of this invention to provide improved apparatus for providing communication between a data processing unit and a plurality of slower operating external devices.

Another object of this invention is to provide apparatus for employment with a data processing unit communicating with a plurality of slower operating external devices for freeing the data processing unit of the costly and time-consuming burden of preparing for one of the many types of data transfer which may be required when an external device requires communication with the data processing unit.

Another object of this invention is to provide rapidly responding, inexpensive, simple and reliable apparatus for providing each one of a plurality of types of communication between a data processing unit and a plurality of external devices.

Another object of this invention is to provide information processing apparatus including a data processing member which communicates with an external device, wherein the external device is adapted to directly control the direction of the transfer effected by the data processing member in transferring data between the memory of the data processing system and the external device.

The foregoing objects are achieved by providing an information processing system wherein control information signals are supplied by an external device required to communicate with a data processing unit, such control signals indicating the required direction of data transfer for communication and the address of the storage location involved in such transfer. Each external device, when preparing to communicate with the data processing unit, delivers a first signal denoting that data is to be transferred from the external device to the memory or a second signal denoting that data is to be transferred from the memory to the external device. The external device also delivers a set of signals representing either the address of a storage location in a first group of storage locations for receiving unprocessed data from the external device, if data is to be received by the memory, or the address of a storage location in a third group of storage locations holding processed data, if data is to be received by the external device. Upon granting communication to an external device, the data processing unit halts execution of its normal sequence of instructions and responds directly to the information signals supplied by the external device, either to transfer data from the external device to the storage location represented by the address signals supplied or to transfer data from the storage location represented by the supplied address signals to the external device. Accordingly, the information processing system of the instant invention frees the data processing unit of the costly and time-consuming burden of preparing signals to control the particular type of communication required by the particular external device granted communication.

Description of drawings

This invention will be described with reference to the accompanying drawings wherein.

Data processing system—General

Figure 1:
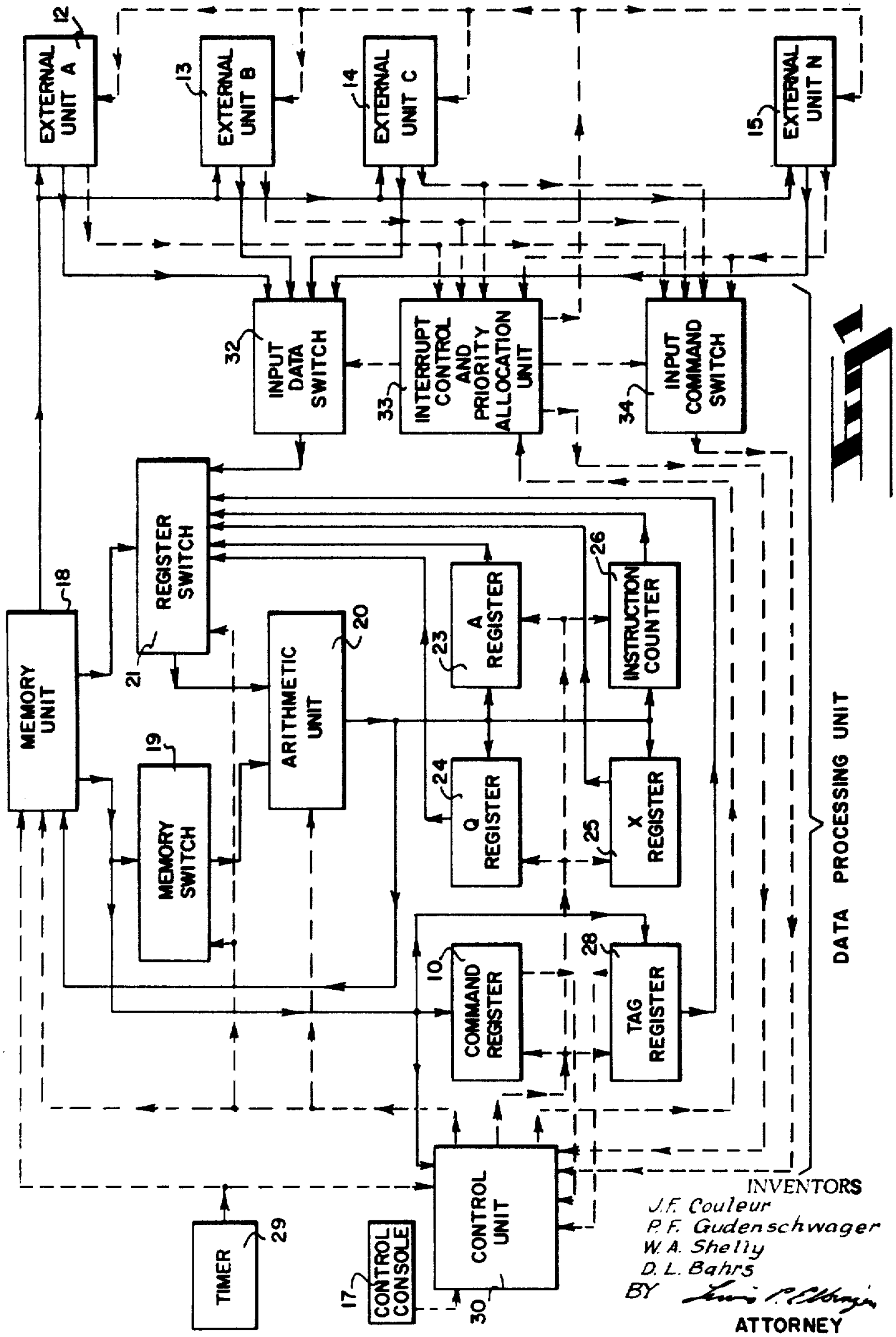
FIGURE 1 is a block diagram of a data processing system embodying the instant invention.

The Data Processing System of FIG. 1 is adapted to process data under the operational control of a Command Register 10 or one of a plurality of external data handling units, such as External Units 12, 13, 14 and 15. The lines interconnecting the various components illustrated in FIG. 1 symbolically represent paths of data and control communication. Thus, the solid lines represent paths of data communication between the components and the dashed lines represent paths for the transfer of control signals between the components.

The System responds to a plurality of distinct commands to execute a plurality of corresponding operations on data, these commands being supplied in sequential order to Command Register 10, or being supplied by each one of External Units 12–15. The portion of the Data Processing System of FIG. 1 directed to receiving data for processing, processing data, and transmission of processed data is identified herein as the Data Processing Unit. Thus, in FIG. 1, all components, except External Units 12–15, comprise the Data Processing Unit.

The Data Processing Unit comprises a Control Console 17, which provides an indicating and control station for the operator, whereby the operator is provided access to the System for modification of the order of execution of the commands or for revision of data. A Memory Unit 18 stores data items, such as operands which are to be processed, operands which are the result of processing, instructions and other control words for the control of the System by Command Register 10, and channel control words for control of the System by the External Units. The remainder of the System communicates with the Memory Unit to receive therefrom and transmit thereto these operands, instructions, and control words.

All operands received from Memory Unit 18 for processing are transferred through a Memory Switch 19 to an Arithmetic Unit 20. Memory Switch 19 transfers operands directly to Arithmetic Unit 20 or shifts the relative numerical position of the elements of the operands and then transfers the shifted elements to Arithmetic Unit 20. Register Switch 21 provides another source of data items for Arithmetic Unit 20. Register Switch 21 receives portions of data items from Memory Unit 18, data items from storage registers in the Data Processing Unit, and data items from the External Units. Arithmetic Unit 20 performs arithmetic operations, such as addition or subtraction, on the data received from Memory Switch 19 and Register Switch 21 and transmits the data results to Memory Unit 18 or to one of the storage registers.

The Data Processing Unit comprises five storage registers in addition to Command Register 10; namely, A Register 23, Q Register 24, X Register 25, Instruction Counter 26, and Tag Register 28. The A Register, the Q Register, and the X Register provide temporary storage for data items currently being processed. Instruction Counter 26 stores an identification of the Memory Unit location of the next instruction to be employed and is periodically incremented so that instructions may be received in sequence from Memory Unit 18. Registers 23, 24, 25, and 26 selectively receive data results from Memory Unit 18. Command Register 10 and Tag Register 28 provide temporary storage for respective portions of instructions received directly from Memory Unit 18. The contents of registers 23, 24, 25, 26 and 28 are selectively supplied to Register Switch 21.

A timer 29 provides timing signals for timing the sequential execution of the individual steps in the operations performed by the System. A Control Unit 30 responds to signals provided by commands in Command Register 10 or to command signals provided by any one of External Units 12–15 for controlling the type of operation being executed by the System. Additionally, Control Unit 30 responds to the timing signals of Timer 29 for controlling the individual steps of each operation.

Data items to be processed by the Data Processing Unit are supplied by External Units 12–15. These External Units also receive and employ the data after it has been processed. The External Units may be, for example, magnetic tape handlers, punched card readers and punches, and electric typewriters. The External Units also may be remote stations in the System for supplying and receiving data. Data supplied by such remote External Units may include missile tracking information provided by a radar station or telemetry information representing, for example, the present conditions of a missile, such as velocity, temperature, and pressure.

Data items supplied by External Units 12–15 are transmitted to an Input Data Switch 32, which selects one of the External Units for transmission of its supplied data item through Register Switch 21, Arithmetic Unit 20, and into Memory Unit 18, Memory Unit 18 storing this data item for subsequent processing. An Interrupt Control and Priority Allocation Unit 33 receives control signals provided by the ones of External Units 12–15 currently demanding communication with the Data Processing Unit and controls Input Data Switch 32 to provide communication for the one of the External Units allocated highest priority.

Additionally, External Units 12–15 supply complete information for controlling the Data Processing Unit in its storage and processing of the data items received from the External Units and in its transmission of the processed data to the External Units. Accordingly, the External Units supply the identifications of Memory Unit locations to Input Data Switch 32 and supply command signals to Input Command Switch 34. Interrupt Control 33 also controls Input Command Switch 34 to transmit to Control Unit 30 the command signals provided by the highest priority External Unit currently demanding communication with the Data Processing Unit. Control Unit 30 responds to these command signals for controlling the handling and processing of the data items supplied by the corresponding External Unit.

Thus the data Processing System of FIG. 1, which embodies the instant invention, receives, processes, and transmits data under control of either a centrally located Command Register or any one of a plurality of external or remote data handling units.

For a complete description of the system of FIGURE 1 and of the instant invention which is embodied in such system, reference is made to United States Patent 3,298,001 issued to John F. Couleur, et al. and assigned to the assignee of the present invention. More particularly, FIGURES 2–26 of the drawings; [column 1, lines 12–56; column 4, lines 72–75; column 5, lines 1–58; column 7, lines 28–75; and columns 8–81] of United States Patent 3,298,001 are incorporated herein by reference and made a part of the instant patent application.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles.

What is claimed is:

1. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, and second command executing means responsive to receipt thereby of a command signal set for controlling said data processing unit to execute the operation represented by said signal set; a data handling unit disposed externally to said data processing unit and adapted to provide a plurality of different command signal sets, said command signal sets respectively representing different operations, said data handling unit supplying one of said command signal sets when said data handling unit must employ said data processing unit to effect the execution of a respective operation, and means for coupling said one command signal set supplied by said data handling unit to said second command executing means.

2. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, interrupt means responsive to receipt thereby of a command signal set for disabling said controllable means, and second command executing means responsive to said command signal set for controlling said data processing unit to execute the operation represented by said signal set; a data handling unit disposed externally to said data processing unit and adapted to provide a plurality of different command signal sets, said command signal sets respectively representing different operations, said data handling unit supplying one of said command signal sets when said data handling unit must employ said data processing unit to effect the execution of a respective operation, and means for coupling said one command signal set supplied by said data handling unit to said interrupt means and to said second command executing means.

3. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, interrupt means responsive to receipt thereby of an interrupt signal for disabling said controllable means, and second command executing means responsive to a command signal set for controlling said data processing unit to execute the operation represented by said signal set; a data handling unit disposed externally to said data processing unit and adapted to provide a plurality of different command signal sets, said command signal sets representing respective different operations, said data handling unit supplying an interrupt signal and one of said signal sets when said data handling unit must employ the command executing facilities of said data processing unit to effect the execution of a respective operation, means for coupling said interrupt signal to said interrupt means, and means for coupling said one command signal set supplied by said data handling unit to said second command executing means.

4. In a data processing system, the combination comprising: a data processing unit comprising first command executing means for controlling said data processing unit to execute a plurality of different operations on data received by said system, each of said operations being executed in response to a respective command signal group received by said means, and controllable means, when enabled, for supplying command signal groups in sequence to said first command executing means; a data handling unit disposed externally to said data processing unit and adapted to provide first and second control signals, said first control signal representing the transfer of data from said data handling unit to said data processing unit and said second control signal representing the transfer of data from said data processing unit to said data handling unit, said data handling unit supplying one of said control signals when said data handling unit must employ said data processing unit to effect the exeution of a respective operation; said data processing unit further comprising second command executing means responsive to said control signals for controlling said data processing unit to execute the operation represented by said control signal, and means for coupling said one control signal supplied by said data handling unit to said command executing means.

5. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, and second command executing means responsive to receipt thereby of a command signal set for controlling said data processing unit to execute the operation represented by said signal set; a plurality of data handling units disposed externally to said data processing unit, each of said data handling units being adapted to provide a plurality of different command signal sets, said command signal sets respectively representing different operations, each one of said data handling units supplying one of said command signal sets when said one data handling unit must employ said data processing unit to effect the execution of a respective operation, and means for coupling said command signal sets supplied by said data handling units to said second command executing means.

6. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, interrupt means responsive to receipt thereby of a command signal set for disabling said controllable means, and second command executing means responsive to said command signal set for controlling said data processing unit to execute the operation represented by said signal set; a plurality of data handling units disposed externally to said data processing unit, each of said data handling units being adapted to provide a plurality of different command signal sets, said command signal sets respectively representing different operations, each one of said data handling units supplying one of said command signal sets when said one data handling unit must employ said data processing unit to effect the execution of a respective operation, and means for coupling said command signal sets supplied by said data handling units to said interrupt means and to said second command executing means.

7. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, interrupt means responsive to receipt thereby of an interrupt signal for disabling said controllable means, and second command executing means responsive to a command signal set for controlling said data processing unit to execute the operation represented by said signal set; a plurality of data handling units disposed externally to said data processing unit, each of said data handling units being adapted to provide a plurality of different command signal sets, said command signal sets respectively representing different operations, each one of said data handling units supplying an interrupt signal and one of said signal sets when said data handling unit must employ the command executing facilities of said data processing unit to effect the execution of a respective operation; means for coupling said interrupt signals to said interrupt means, and means for coupling said command signal sets supplied by said data handling units to said second command executing means.

8. In a data processing system, the combination comprising: a data processing unit comprising first command executing means for controlling said data processing unit to execute a plurality of different operations on data received by said system, each of said operations being executed in response to a respective command signal group received by said means, controllable means, when enabled, for supplying command signal groups in sequence to said first command executing means, interrupt means responsive to receipt thereby of an interrupt signal for disabling said controllable means, and second command executing means responsive to a control signal for controlling said data processing unit to execute the operation represented by said control signal; a plurality of data handling units disposed externally to said data processing unit, each of said data handling units being adapted to provide first and second control signals, said first control signal representing the transfer of data from said data handling unit to said data processing unit and said second control signal representing the transfer of data from said data processing unit to said data handling unit, each one of said data handling units supplying an interrupt signal and one of said control signals when said data handling unit must employ the command executing facilities of said data processing unit to effect the execution of a respective operation; means for coupling said interrupt signals to said interrupt means, and means for coupling said control signals supplied by said data handling units to said second command executing means.

9. In a data processing system, the combination comprising: a data processing unit comprising first command executing means for controlling said data processing unit to execute a plurality of different operations on data received by said system, each of said operations being executed in response to a respective command signal group received by said means, a data storage member for storing a plurality of data items in a corresponding plurality of storage locations, a register for storing an address item identifying a respective one of said storage locations, controllable means, when enabled, for supplying command signal groups in sequence to said first command executing means, and interrupt means responsive to receipt thereby of an interrupt signal for disabling said controllable means; a plurality of data handling units disposed externally to said data processing unit, each of said data handling units being adapted to provide first and second control signals, said first control signal representing the transfer of data from said data handling unit to said data processing unit and said second control signal representing the transfer of data from said data processing unit to said data handling unit, each one of said data handling units supplying an interrupt signal, an address item, and one of said control signals when said data handling unit must employ the command executing facilities of said data processing unit to effect the execution of a respective operation; said data processing unit further comprising means for coupling said interrupt signals to said interrupt means, means for coupling said address items supplied by said data handling units to said register, second command executing means responsive to a control signal received thereby for controlling said data processing unit to transfer data between the data handling unit supplying said control signal and the storage location identified by the contents of said register, the direction of data transfer controlled by said second command executing means corresponding to the control signal received by said second command executing means, and means for coupling said control signals supplied by said data handling units to said second command executing means.

10. In a data processing system, the combination comprising: a data processing unit comprising first command executing means for controlling said data processing unit to execute a plurality of different operations on data received by said system, each of said operations being executed in response to a respective command signal group received by said means, a data storage member for storing a plurality of data items in a corresponding plurality of storage locations, a register for storing an address item identifying a respective one of said storage locations, controllable means, when enabled, for supplying command signal groups in sequence from said data storage member to said first command executing means, and interrupt means responsive to receipt thereby of an interrupt signal for disabling said controllable means, a plurality of data handling units disposed externally to said data processing unit, each of said data handling units being adapted to provide first and second control signals, said first control signal representing the transfer of data from said data handling unit to said data processing unit and said second control signal representing the transfer of data from said data processing unit to said data handling unit, each one of said data handling units supplying an interrupt signal, an address item, and one of said control signals when said data handling unit must employ the command executing facilities of said data processing unit to effect the execution of a respective operation; said data processing unit further comprising means for coupling said interrupt signals to said interrupt means, means for coupling said address items supplied by said data handling units to said register, second command executing means responsive to a control signal received thereby for controlling said data processing unit to transfer data between the data handling unit supplying said control signal and the storage location identified by the contents of said register, the direction of data transfer controlled by said second command executing means corresponding to the control signal received by said second command executing means, and means for coupling said control signals supplied by said data handling units to said second command executing means.

11. In a data processing system, the combination comprising: a first data processing member for executing a plurality of different operations on data received thereby, each of said operations being executed in response to a respective command signal group received by said first member, controllable means, when enabled, for supplying command signal groups in sequence to said first member, a data storage member for storing a plurality of data items in a corresponding plurality of storage locations, a data handling unit disposed externally to said first member and selectively providing first and second control signals, said first control signal representing the transfer of data from said data handling unit to said storage member and said second control signal representing the transfer of data from said storage member to said data handling unit, a second data processing member responsive to said control signals for transferring data between said storage member and said data handling unit in the direction represented by said control signals, interrupt means responsive to said control signals for disabling said controllable means, and means for coupling the control signal provided by said data handling unit to said second member and said interrupt means.

References Cited

UNITED STATES PATENTS 3,178,690 4/1965 Masters et al. ------ 340—172.5

ROBERT C. BAILEY, Primary Examiner

G. D. SHAW, Assistant Examiner